(12) United States Patent
Bonnet et al.

(10) Patent No.: US 7,179,863 B2
(45) Date of Patent: Feb. 20, 2007

(54) USE OF A FILM BASED PVDF, PMMA OR A BLEND THEREOF FOR COVERING ARTICLES MADE OF A THERMOSET

(75) Inventors: Anthony Bonnet, Beaumont le Roger (FR); Philippe Bussi, Rouen (FR); David Silagy, Evreux (FR)

(73) Assignee: Arkema France, Puteaux (FR)

( * ) Notice: Subject to any disclaimer, the term of this patent is extended or adjusted under 35 U.S.C. 154(b) by 464 days.

(21) Appl. No.: 10/678,795

(22) Filed: Oct. 3, 2003

(65) Prior Publication Data

US 2004/0137252 A1    Jul. 15, 2004

Related U.S. Application Data

(60) Provisional application No. 60/425,328, filed on Nov. 12, 2002.

(30) Foreign Application Priority Data

Oct. 3, 2002    (FR) .................................. 02 12263

(51) Int. Cl.
*B32B 7/12*    (2006.01)
*C08L 27/16*    (2006.01)

(52) U.S. Cl. ...................... 525/222; 525/285; 525/199; 525/223; 525/227; 525/276; 525/326.2; 428/1.61; 428/41; 428/355 AC; 428/317.1; 428/317.3; 428/317.7; 428/343

(58) Field of Classification Search ................ 525/213, 525/292, 222, 285, 199, 223, 227, 276, 326.2; 428/1.61, 421, 355 AC, 317.1, 317.3, 317.7, 428/343, 41.5
See application file for complete search history.

(56) References Cited

U.S. PATENT DOCUMENTS

| 4,364,886 A | 12/1982 | Strassel |
| 4,581,412 A | 4/1986 | Ohmori et al. |
| 4,990,406 A * | 2/1991 | Kappler et al. ............. 428/422 |
| 5,242,976 A | 9/1993 | Strassel et al. |
| 6,479,161 B1 * | 11/2002 | Araki et al. ................ 428/515 |

FOREIGN PATENT DOCUMENTS

JP           05-220907         8/1993

* cited by examiner

*Primary Examiner*—James J. Seidleck
*Assistant Examiner*—Olga Asinovsky
(74) *Attorney, Agent, or Firm*—Thomas F. Roland

(57) ABSTRACT

The present invention relates to the use of films, formed from an adhesive layer and a layer (A), for coating articles made of a thermoset, the adhesive layer comprising, by weiqht: 0 to 60 parts of PVDE, 10 to 100 parts of functionalized PMMA, 0 to 50 parts of an acrylic elastomer and 0 to 4 parts of a UV absorber, the total making up 100 parts, the layer (A) comprising, as main constituents, 0 to 100 parts of PVDF per 100 to 0 parts of PMMA, respectively. This film may be manufactured by coextrusion and is then fixed to the thermoset, for example by hot pressing.

The invention also relates to an SMC (Sheet Moulding Compound) multilayer structure comprising, in this order: a backing film, a crosslinkable composition (the precursor of the thermoset), the above adhesive layer and the above layer (A).

14 Claims, 11 Drawing Sheets

PRODUCTION OF PREPREGS (SMC) COATED WITH
THE TIE/PVDF BILAYER FILM

CONTACT MOULDING OR CONTACT LAMINATION ON A TIE/PVDF BILAYER FILM

SIMULTANEOUS SPRAYING ONTO TIE/PVDF BILAYER FILM

INJECTION/OVERMOULDING ON TIE/PVDF BILAYER FILM

PULTRUSION WITH LAMINATION OF A TIE/PVDF BILAYER FILM

CONTINUOUS LAMINATION OF TWO TIE/PVDF BILAYER FILMS

USE OF A FILM BASED PVDF, PMMA OR A BLEND THEREOF FOR COVERING ARTICLES MADE OF A THERMOSET

This application claims priority from provisional application No. 60/425,328 filed Nov. 12, 2002.

FIELD OF THE INVENTION

PVDF (polyvinylidene fluoride), because of its very good weathering resistance, radiation resistance and chemical resistance, is used to protect articles or materials. In addition, it is appreciated for its shiny appearance and its resistance to graffiti. It is therefore used to coat all kinds of substrates, and in particular thermosets, with a PVDF film. However, PVDF adheres very poorly to thermosets and it is therefore necessary to have an adhesive composition between the PVDF and the thermoset. This composition is coextruded with the PVDF to form a two-layer film and then this film is fixed to the thermoset, for example by hot pressing. It is thus possible to place the two-layer film in a mould, the PVDF layer being placed against the wall of the mould, then to inject the precursor of the thermoset into the mould and then to cause crosslinking in order to obtain a PVDF-coated thermoset. The PVDF may also be a PVDF/PMMA blend. For applications under less aggressive conditions, it is possible to use only PMMA.

BACKGROUND OF THE INVENTION

U.S. Pat. No. 4,581,412 discloses crosslinkable compositions that are copolymers of fluoromonomers and functionalized monomers. They are applied, as aqueous emulsions or in solvents, to substrates and then crosslinked.

patent application JP 52-87231 A discloses a similar coating, but applied to a material not yet crosslinked.

The coatings obtained have good properties due to the presence of fluoromonomers, but they are of the paint or varnish type and have nothing to do with a PVDF film bonded to a substrate. In particular, these coatings have a weatherability which is inferior to that of PVDF films bonded to a substrate.

U.S. Pat. No. 4,364,886 discloses a substrate made of ABS or of a thermoset based on an unsaturated polyester covered with a PVDF film, and an adhesive is placed between the PVDF and the substrate. This adhesive is either PMMA or a blend, by weight, of 30% of PMMA, 40% of an acrylic elastomer, 25% of ABS and 5% of a zinc oxide/zinc sulphide mixture.

Patent Application JP 52-20907 A discloses a structure comprising, in the following order: a layer of uncrosslinked resin mixed with glass fibres, a sheet of glass fibres or polyester fibres, and then a layer consisting of an acrylic ester or vinylidene fluoride resin.

These structures do not exhibit sufficient adhesion of the PVDF layer. It has now been found that it is possible to coat substrates made of a thermoset with a film of PVDF, PMMA or a PVDF/PMMA blend provided that a layer based on a functionalized PMMA is placed between this film and the substrate. It has also been discovered that these films can be used in the SMC technique (this term is described later).

U.S. Pat. No. 5,242,976 discloses a composition that can be coextruded with PVDF in order to make it adhere to substrates that may be of polyester. The composition is a blend, by weight, of 27 to 50% PMMA, 17.5 to 36.5% PVDF and 25 to 47.45% of an acrylic elastomer. The PMMA may contain a monomer chosen from styrene, alpha-methylstyrene, acrylonitrile and (meth)acrylic acid. It has now been found that for there to be adhesion to the thermoset, the PMMA must be functionalized.

SUMMARY OF THE INVENTION

The present invention relates to the use of films, formed from an adhesive layer and a layer (A), for coating articles made of a thermoset, the adhesive layer comprising, by weight:
 0 to 60 parts of PVDF,
 10 to 100 parts of functionalized PMMA,
 0 to 50 parts of an acrylic elastomer,
 0 to 4 parts of a UV absorber,
 the balance making up 100 parts, the layer (A) comprising, as main constituents, 0 to 100 parts of PVDF per 100 to 0 parts of PMMA, respectively.

According to a variant, the adhesive layer may consist of two adjacent layers, one being like that described above and the other essentially consisting of functionalized PMMA and optionally of an acrylic elastomer and placed opposite the layer (A). The order of the constituents is: the layer essentially consisting of functionalized PMMA and optionally of an acrylic elastomer, the above adhesive layer (functionalized PMMA, optional PVDF, optional acrylic elastomer and optional UV absorber) and the layer (A).

The film may include a peelable protective layer placed adjacent to the layer (A), that is to say on the opposite side from the adhesive layer. This layer is peeled off after the film has been fixed to the thermoset.

According to a second embodiment of the invention, the layer (A) is in the form of two layers:
 one layer placed against the adhesive layer and comprising, as main constituents, 50 to 90 parts of PVDF per 50 to 10 parts of PMMA, respectively;
 the other layer (also called the outer layer) comprising, as main constituents, 75 to 100 parts of PVDF per 25 to 0 parts of PMMA, respectively.

This film may be manufactured by coextrusion and is then fixed to the thermoset, for example by hot pressing. It is also possible to place the film in a mould, the layer (A) being placed against the wall of the mould, then injecting the precursor of the thermoset into the mould (i.e. on the adhesive layer side) and then to cause crosslinking in order to obtain a thermoset coated with the layer (A).

The invention also relates to the substrates coated with this film, the adhesive composition being placed against the substrate.

The invention also relates to an SMC (Sheet Moulding Compound) muyltilayer structure comprising, in the following order:
 a backing film;
 a crosslinkable composition (the precursor of the thermoset);
 an adhesive layer comprising, by weight:
 0 to 60 parts of PVDF,
 10 to 100 parts of functionalized PMMA,
 0 to 50 parts of an acrylic elastomer,
 0 to 4 parts of a UV absorber,
 the balance making up 100 parts, a layer (A) comprising, as main constituents, 0 to 100 parts of PVDF per 100 to 0 parts of PMMA, respectively.

As above, a peelable protective layer may be placed adjacent to the layer (A) and this layer (A) may optionally be in the form of two layers.

The SMC structure is cut as required, the backing film is peeled off, the structure is placed in a mould and then crosslinked in order to obtain an article made of a thermoset covered with a film of the layer (A).

According to a second embodiment of this SMC structure, the backing film may be replaced with an adhesive layer and a layer (A), that is to say what is obtained is a symmetrical structure in which the crosslinkable composition is at the centre.

As in the first embodiment of the SMC structure above, a peelable protective layer may be placed on one or each side of the layers (A). As in the first embodiment of the SMC structure above, one of the layers (A) or each of the layers (A) may be in the form of two layers.

The SMC structure is cut as required, it is placed in a mould and then crosslinked in order to obtain an article made of a thermoset covered on each side, or completely depending on its shape, with a layer (A).

DETAILED DESCRIPTION OF THE INVENTION

Figure 1:
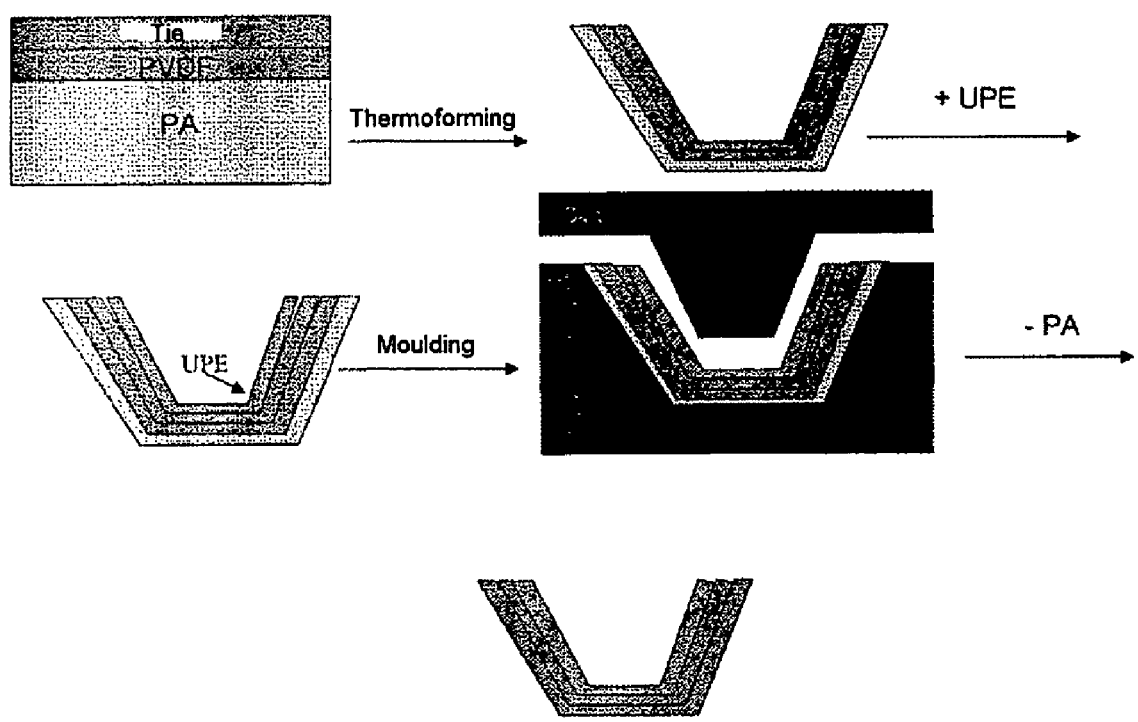
FIG. 1 shows a polyamide peelable layer (the backing layer) and the production of an article after the film has been thermoformed; "tie" denotes the adhesive layer and "PVDF" denotes the layer (A) formed from PVDF.
Figure 2:
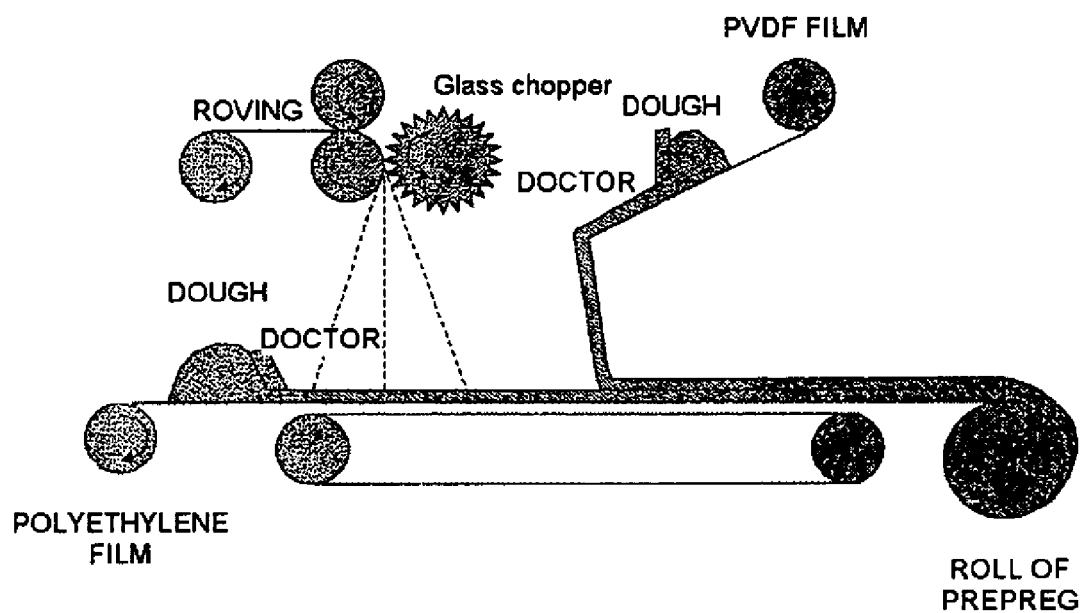
FIG. 2 shows the manufacture of an SMC structure in which the backing film is made of polyethylene; "roving" denotes the glass fibres and "PVDF film" denotes the film formed from the adhesive layer and the layer (A).
Figure 3:
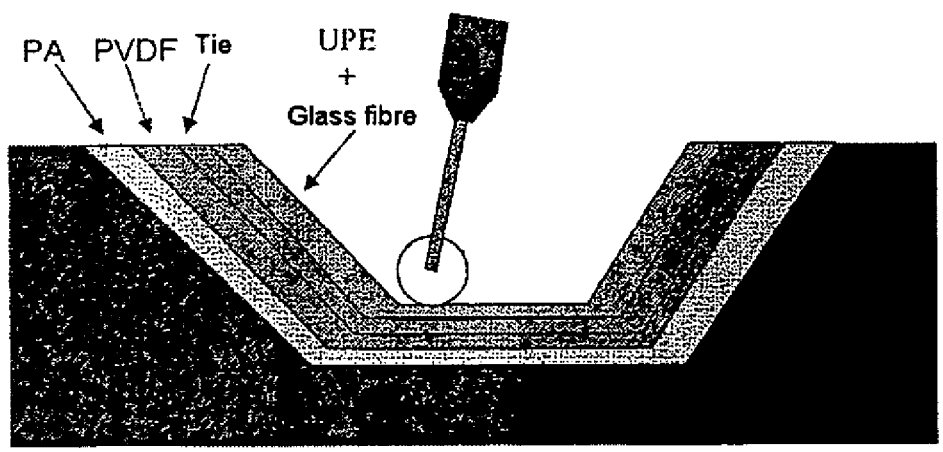
FIG. 3 shows a three-layer structure formed from the adhesive (tie) layer, a PVDF layer (A) preferably bonded to the tie, and a thick temporary polyamide sheet (temporary layer) placed in the bottom of the mould; a glass mat is placed on this three-layer, then the mat is sprayed with a UPE or VE resin and this resin is made to penetrate using stiff brushes or rollers; this operation will be repeated until the desired thickness is obtained. A gel-coat may be deposited between the tie according to the invention and the first, glass mat/resin layer.
Figure 4:
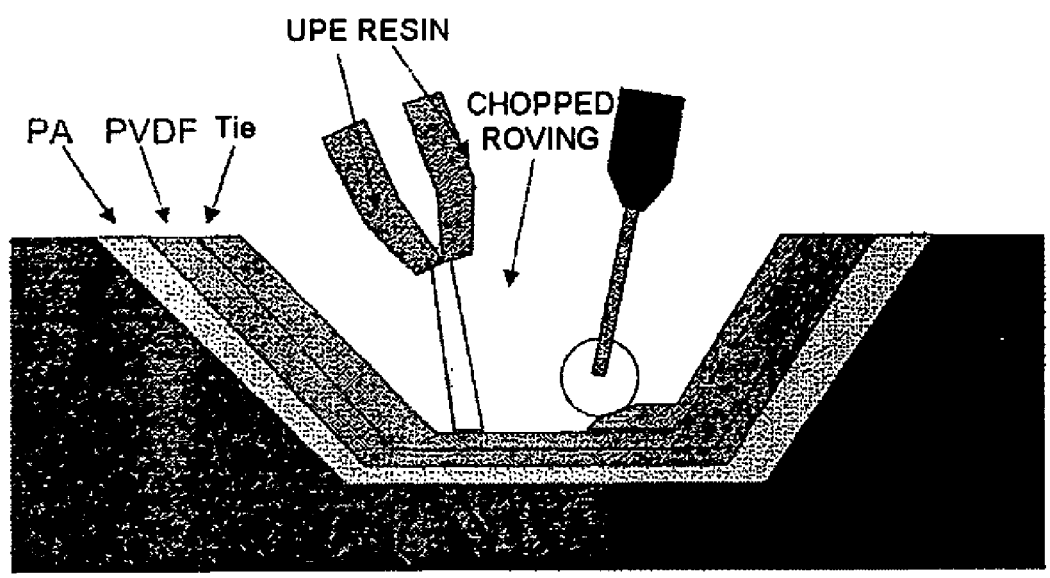
FIG. 4 shows that the glass/resin may also be deposited by simultaneous spraying, using a spraying machine which deposits, on the tie according to the invention/layer (A) bilayer film, a chopped roving which is impregnated with UPE resin in the gun jet during its transfer. After the reaction, the polyamide sheet may be removed and recycled.
Figure 5:
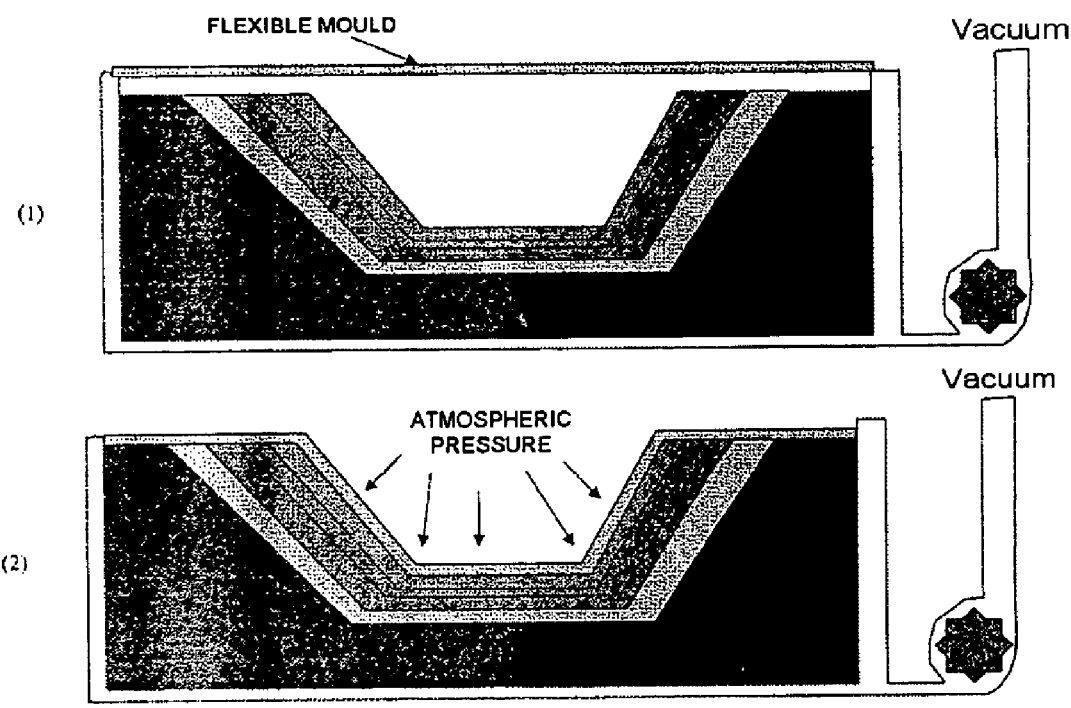
FIG. 5 shows the trilayer formed from the adhesive layer (the tie), a PVDF layer (A) perfectly bonded to the tie, and a thick temporary polyamide sheet. It is placed at the bottom of the mould, the resin and the glass mat are deposited in contact with the tie and then, using a flexible countermould, atmospheric pressure is used, by use of a vacuum, to force the resin to penetrate into the glass mat. After the reaction, the polyamide sheet may be removed and recycled.
Figure 6:
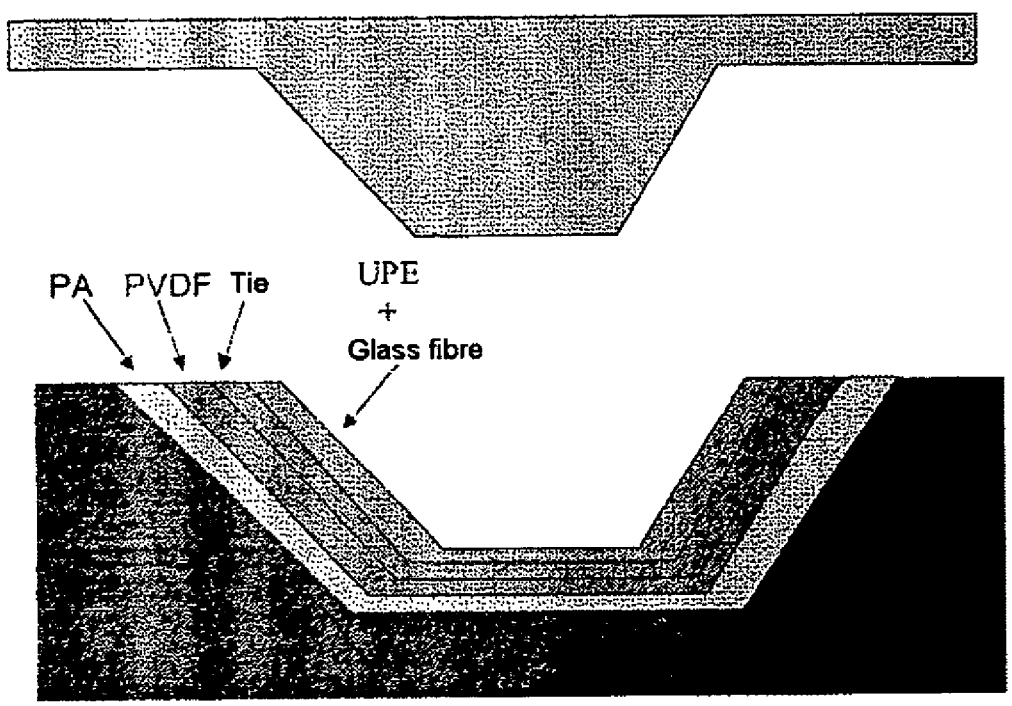
FIG. 6 shows the trilayer formed from the adhesive layer (the tie), a PVDF layer (A) preferably bonded to the tie, and a thick temporary polyamide sheet. It is deposited in the bottom of the mould, the flexible countermould of the bag moulding is replaced with a rigid mould supported by a press. During cold pressing, the heat provided by the exothermic reaction makes it possible by itself to cause bonding at around 50 to 60° C. During moulding, the countermould and the mould may be heated so that the reaction can take place at 100 to 150° C. After the reaction, the polyamide sheet may be removed and recycled.
Figure 7:
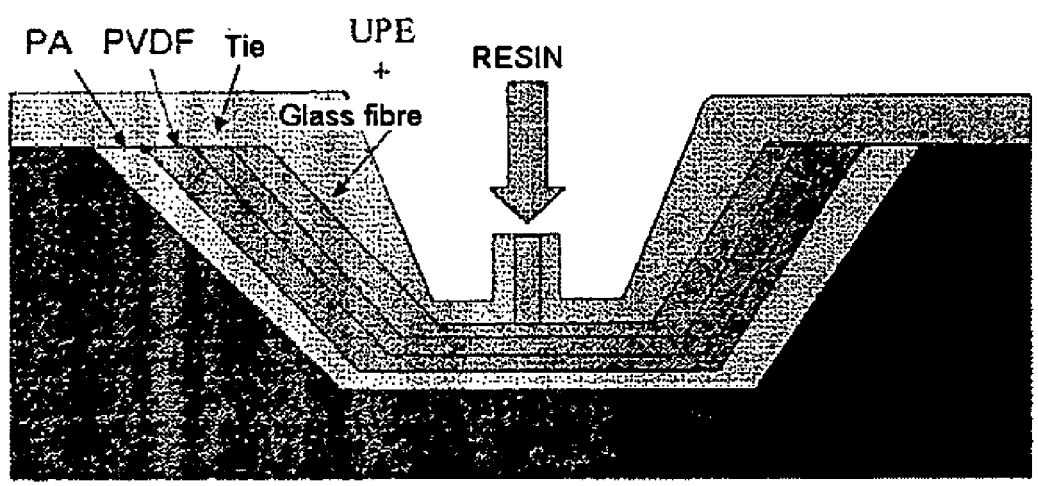
FIG. 7 shows the tri-layer formed from the adhesive layer (the tie), a PVDF layer (A) completely bonded to the tie, and a thick temporary polyamide sheet. It is placed in the bottom of the mould, and the glass mat is then placed inside the mould in contact with the tie according to the invention. The liquid resin is then injected into the fibrous reinforcement, either under pressure or by creating a vacuum in the mould. After the reaction, the polyamide sheet may be removed and recycled.
Figure 8:
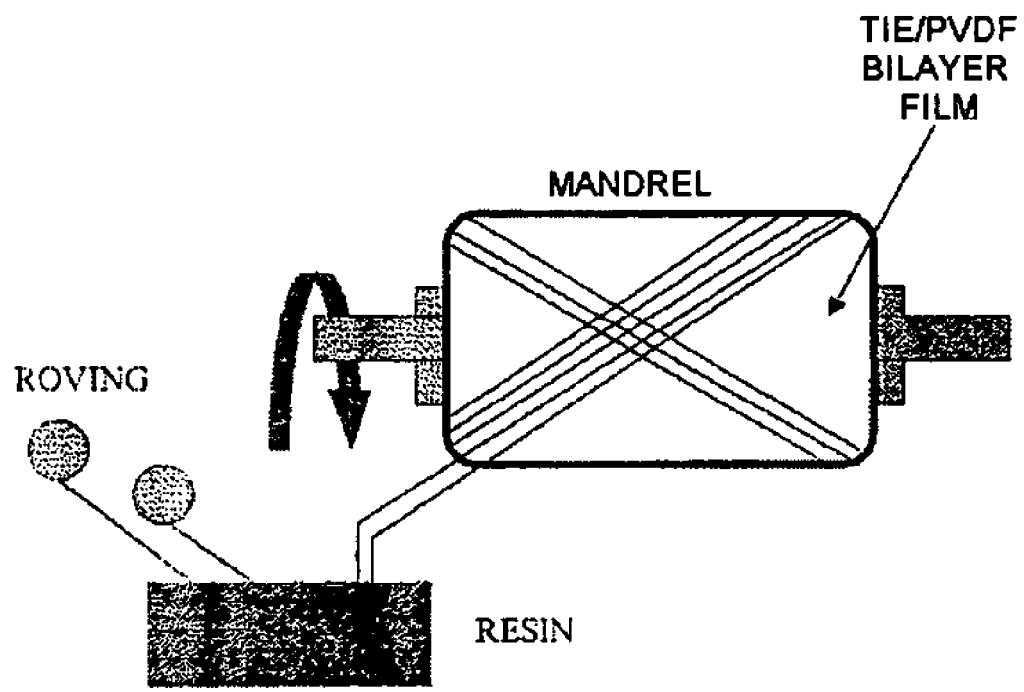
FIG. 8 shows a bilayer formed from the adhesive (tie) layer according to the invention and a perfectly bonded PVDF layer (A), the said bilayer being deposited on a mandrel onto which resin-impregnated glass fibres are wound according to a well-established and calculated distribution programme. One of the difficulties with this operating technique is to remove the mandrel once the reaction has been carried out. The use of fluorinated materials on the surface greatly facilitates the demoulding operation.
Figure 9:
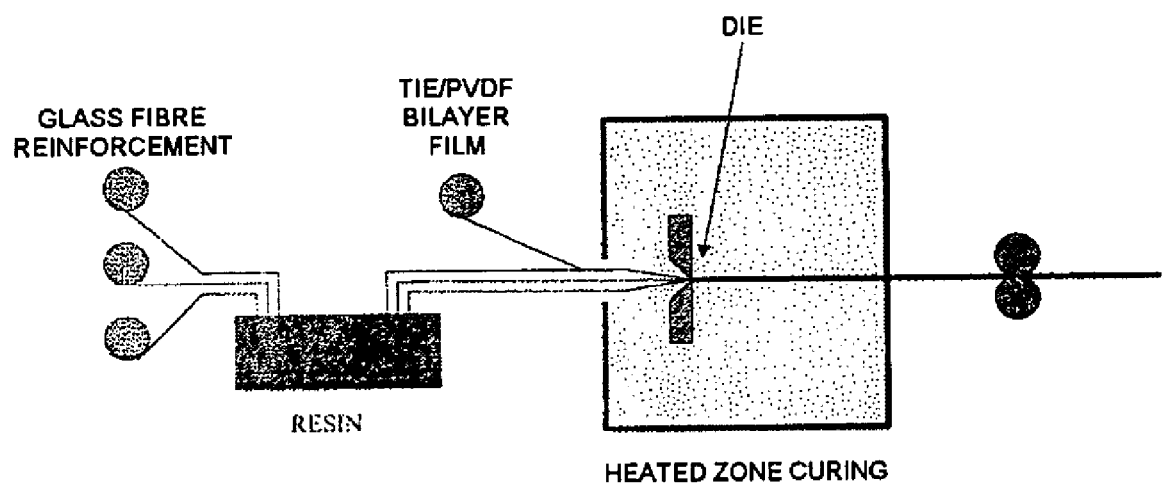
FIG. 9 shows a bilayer formed from the adhesive layer (the tie) and a perfectly bonded PVDF layer (A), which is deposited by lamination on the resin-impregnated glass fibre. This impregnated fibre coated with the bilayer according to the invention is forced through a heated die, which results in curing of the resin and bonding to the bilayer.
Figure 10:
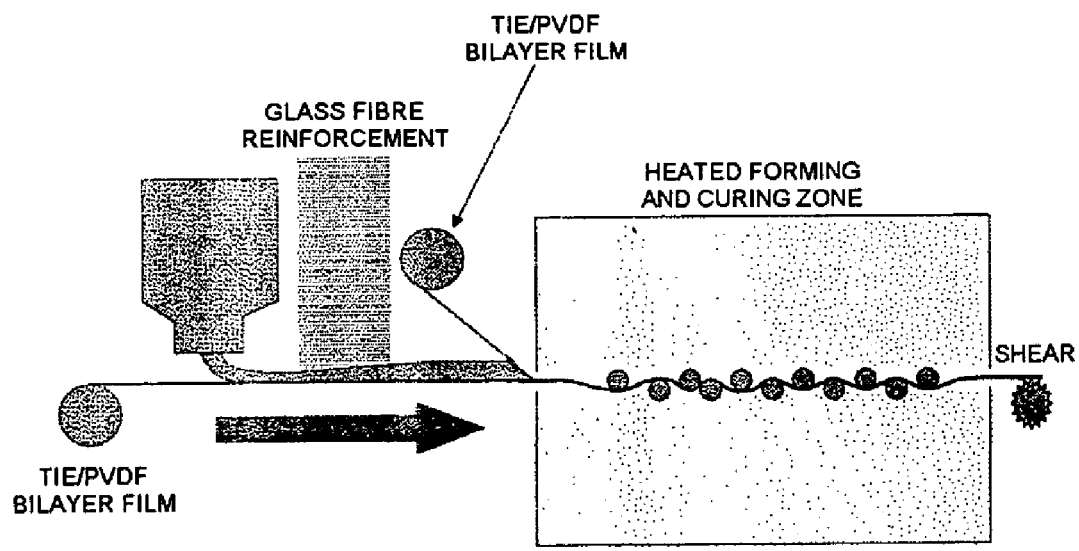
FIG. 10 shows that roving is deposited with the resin between two pulled bilayer (adhesive layer and PVDF layer (A)) structures according to the invention or between a bilayer structure according to the invention and a sheet of cellophane, both these being pulled. The sheets present on each side of the filled resin serve as a mould. The structure runs through a heated oven in which, as soon as the resin gels, the forming operation is carried out using formers. At the exit, if a cellophane layer was used, it is removed.
Figure 11:
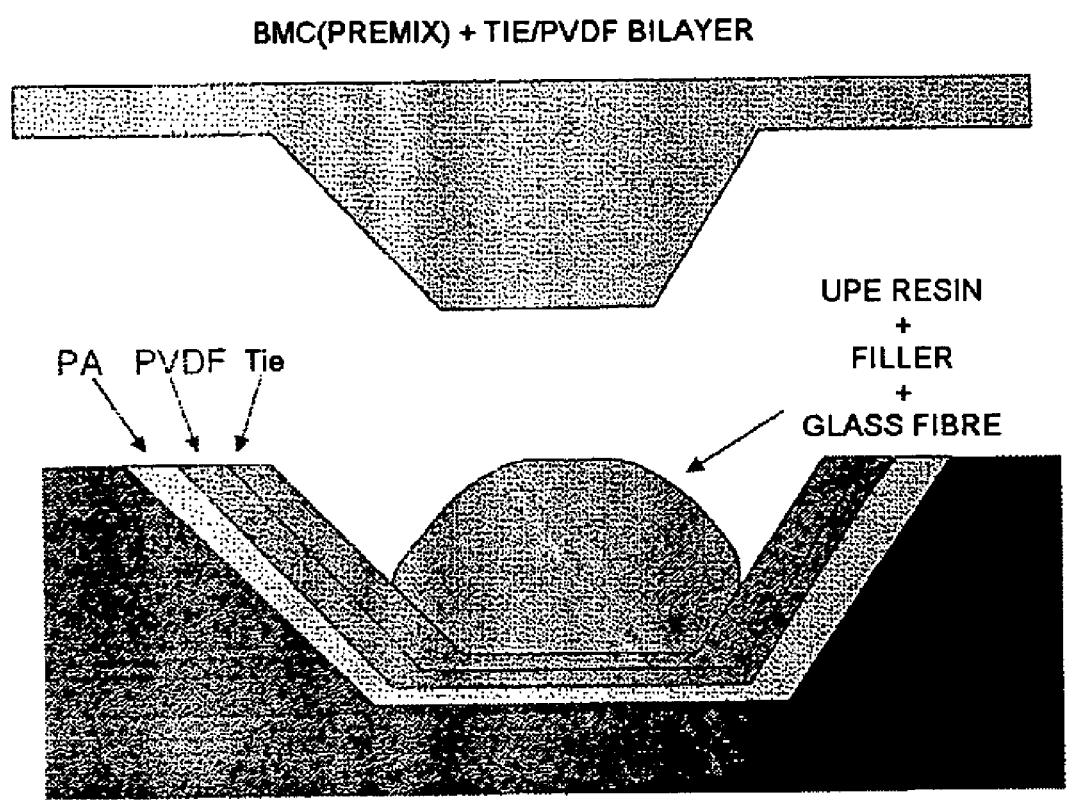
FIG. 11 shows that the precursor of the thermoset may be placed in the bottom of a mould. The temperature is then increased up to 120–150° C. under relatively high pressures of 10 to 100 bar. Production of a BMC part consists in thickening the liquid polyester resin, containing peroxides with fillers having a high oil uptake, with glass fibres using a Z-blade mixer or an extruder. The dough obtained is deposited on a bilayer film according to the invention (adhesive layer, also called tie, and PVDF layer (A)), the dough being in contact with the tie layer in the bottom of a mould. The moulding is then carried out hot.

With regard to the thermoset, this is defined as being formed from polymer chains of variable length linked together by covalent bonds so as to form a three-dimensional network. As an example, mention may be made of cyanoacrylates, bismaleimides, epoxy resins crosslinked by a hardener, unsaturated polyesters crosslinked by means of a reactive solvent, and vinyl esters also crosslinked by means of a reactive solvent.

Among cyanoacrylates, mention may be made of 2-cyanoacrylic esters, which are thermosets obtained by polymerization of the monomer $CH_2=C(CN)COOR$ with various possible groups R (without the need to add a hardener).

The bismaleimide-type thermoset formulations are, for example:
methylenedianiline+benzophenone dianhydride+nadic imide;
methylenedianiline+benzophenone dianhydride+phenylacetylene
methylenedianiline+maleic anhydride+maleimide.

Among the thermoset networks (or thermosets), mention may be made, for example, of the networks resulting from the reaction of an unsaturated polyester (UPE) or from a vinyl ester (VE) with a reactive solvent. As an example, mention may be made of the networks resulting from the radical copolymerization reaction between a reactive solvent, preferably styrene or an acrylic monomer, or a mixture of reactive solvents, and fumaric double bonds included in the polyester prepolymers, which are consequently called unsaturated polyester prepolymers. These unsaturated polyester prepolymers result from a polyesterification between diacids or acid anhydrides or a mixture of an anhydride and an acid, at least one of which is unsaturated—mention may be made, for example, of maleic anhydride or phthalic anhydride—and polyols—mention may be made, for example, of 1,2-propylene glycol. The radical copolymerization between the unsaturated prepolymer and the reactive solvent may be initiated either by peroxides, or by a catalytic effect in the presence of salts of heavy metals or of an amine, or by using a light/photoinitiator pair, or using ionizing radiation, or else a judicious combination of these various initiating means.

The thermosets may also result from the reaction of a vinyl ester resin with a reactive solvent. These vinyl ester resins result from the condensation of epoxides with acrylic or methacrylic acids.

These thermosets may also result from the reaction of a blend of a polyester prepolymer and a vinyl ester resin with a reactive solvent.

The thermosets, based on UPE or VE or of a UPE/VE blend, may contain fillers, mould release agents, fibrous reinforcements, UV stabilizers, additives for improving the storage stability before crosslinking, and optical brighteners or pigments.

The thermoset may, of course, be covered with a gel-coat. This gel-coat is a layer of pure resin making it possible to have an attractive surface appearance.

These thermosets based on an unsaturated polyester or a vinyl ester resin are described in Ullman's "Encyclopedia of Industrial Chemistry", VCH Publishers, 5th edition, Vol. A21, pages 217–251.

With regard to the films formed from an adhesive layer and a layer (A), the PVDF and the PMMA of the layer (A) are firstly described.

With regard to PVDF, this denotes PVDFs, vinylidene fluoride (VF2) homopolymers and vinylidene fluoride (VF2) copolymers preferably containing at least 50% by weight VF2 and at least one other monomer copolymerizable with VF2. Advantageously, the comonomer is fluorinated and may be chosen, for example, from: vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro (methyl vinyl) ether (PMVE), perfluoro(ethyl vinyl) ether (PEVE) and perfluoro(propyl vinyl) ether (PPVE); perfluoro (1,3-dioxole); and perfluoro(2,2-dimethyl-1,3-dioxole) (PDD). Preferably, the optional comonomer is chosen from chlorotrifluoroethylene (CTFE), hexafluoropropylene (HFP), trifluoroethylene (VF3) and tetrafluoroethylene (TFE).

Advantageously, the PVDF has a viscosity ranging from 100 Pa.s to 2000 Pa.s, the viscosity being measured at 230° C., at a shear rate of 100s$^{-1}$, using a capillary rheometer. This is because such PVDFs are well suited to extrusion and to injection moulding. Preferably, the PVDF has a viscosity ranging from 300 Pa.s to 1200 Pa.s, the viscosity being measured at 230° C., at a shear rate of 100 s$^{-1}$, using a capillary rheometer.

With regard to the PMMA, these are methyl methacrylate homopolymers and copolymers containing at least 50% methyl methacrylate by weight. As examples of comonomers, mention may be made, for example, of alkyl (meth) acrylates, acrylonitrile, butadiene, styrene and isoprene. Examples of alkyl (meth)acrylates are described in Kirk-Othmer, "Encyclopedia of Chemical Technology", 4$^{th}$ edition in Vol. 1, pages 292–293 and in Vol. 16, pages 475–478. Advantageously, the PMMA may contain 0 to 20%, and preferably 5 to 15%, by weight of at least one other alkyl (meth)acrylate, such as, for example, methyl acrylate and/or ethyl acrylate. The PMMA may be functionalized, that is to say it contains, for example, acid, acid chloride, alcohol, anhydride or ureido functional groups. These functional groups may be introduced by grafting or by copolymerization. With regard to the acid functional groups, these are advantageously acid functional groups, these are advantageously acid functional groups provided by the acrylic or methacrylic acid comonomer. Two adjacent acrylic acid functional groups may lose water to form an anhydride according to the following formula, in which m is 0 or 1:

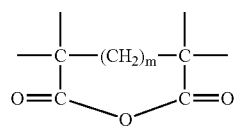

With regard to the ureido functional group, this may be provided by the following acrylates:

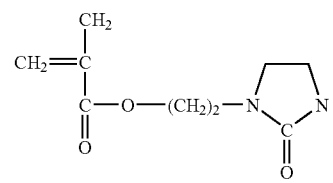

The proportion of functional groups may be from 0 to 15% by weight of the PMMA including the optional functional groups.

The MVI (melt volume index) of the PMMA may be between 2 and 15 cm$^3$/10 min measured at 230° C. under a load of 3.8 kg.

The PMMA may contain an acrylic elastomer. There are commercial grades of PMMA, called "impact grade" PMMA, which contain acrylic impact modifiers, usually of the core/shell type. These acrylic impact modifiers may also be present in the PMMA because they are introduced during its polymerization or prepared simultaneously during its polymerization. This proportion of acrylic elastomer may be from 0 to 30 parts, per 100 to 70 parts of PMMA respectively, by weight. The acrylic elastomer is described later in the section regarding the adhesive layer.

Advantageously, the layer (A) comprises, as main constituents, 50 to 100 parts of PVDF per 50 to 0 parts of PMMA respectively, more advantageously the layer (A) comprises, as main constituents, 70 to 100 parts of PVDF per 30 to 0 parts of PMMA respectively, and preferably 75 to 85 parts of PVDF per 25 to 15 parts of PMMA, respectively. This layer may contain pigments or dyes.

With regard to the film from an adhesive layer and a layer (A), the adhesive layer will now be described. The PVDF may be chosen from those mentioned above in the case of the PVDF layer. The PMMA is chosen from the functionalized PMMA that were mentioned above in the case of the PVDF layer. If the layer (A) is transparent, that is to say it contains no dyes or pigments, it is recommended to add a UV absorber to the adhesive layer.

This is because if the thermoset articles coated with the layer (A) are exposed to daylight, the adhesive layer is damaged—it is no longer adhesive and the layer (A) debonds from the thermoset.

With regard to the UV absorber, these products are known per se. Such products are mentioned in U.S. Pat. No. 5,256,472. It is advantageous to use benzotriazoles or benzophenones. For example, mention may be made of TINUVIN 213 or TINUVIN 109 and preferably TINUVIN 234 from Ciba Specialty Chemicals. Advantageously, the proportion of UV absorber is from 2 to 3 parts per 100 parts of adhesive layer.

The adhesive layer may contain an acrylic elastomer. Its presence improves the quality of the adhesion (increases the peel force) and gives better mechanical integrity to the films formed from the adhesive layer and PVDF layer. Thus, it is easier to handle them in order to fix them to an article made of a thermoset.

With regard to the acrylic elastomer, these are elastomers based on at least one monomer chosen from acrylonitrile, alkyl (meth)acrylates and core/shell copolymers. With regard to core/shell copolymers, these are in the form of fine particles having an elastomer core and at least one thermoplastic shell—the size of the particles is generally less than 1 μm and advantageously between 50 and 300 nm. As examples of cores, mention may be made of isoprene or butadiene copolymers, isoprene copolymers with at most 30 mol % of a vinyl monomer and butadiene copolymers with at most 30 mol % of a vinyl monomer. The vinyl monomer may be styrene, an alkyl styrene, acrylonitrile or an alkyl (meth)acrylate. Another family of cores consists of homopolymers of an alkyl (meth)acrylate and copolymers of an alkyl (meth)acrylate with at most 30 mol % of a monomer chosen from another alkyl (meth)acrylate and a vinyl monomer. The alkyl (meth)acrylate is advantageously butyl acrylate. The vinyl monomer may be styrene, an alkyl styrene, acrylonitrile, butadiene or isoprene. The core of the core/shell copolymer may be completely or partly crosslinked. It is sufficient to add at least difunctional monomers during preparation of the core, these monomers possibly being chosen from polyol poly(meth)acrylic esters such as butylene di(meth)acrylate and trimethylolpropane trimethacrylate. Other difunctional monomers are, for example, divinylbenzene, trivinylbenzene, vinyl acrylate and vinyl methacrylate. It is also possible to crosslink the core by introducing into it, by grafting or as comonomer during the polymerization, unsaturated functional monomers such as unsaturated carboxylic acid an hydrides, unsaturated carboxylic acids and unsaturated epoxides. Mention may be made, for example, of maleic anhydride, (meth)acrylic acid and glycidyl methacrylate.

The shell or shells are homopolymers of styrene, an alkyl styrene or methyl methacrylate or copolymers comprising at least 70 mol % of one of these monomers mentioned above and at least one comonomer chosen from the other monomers mentioned above, or another alkyl (meth)acrylate, vinyl acetate and acrylonitrile. The shell may be functionalized by introducing into it, by grafting or as comonomer during the polymerization, unsaturated functional monomers such as unsaturated carboxylic acid anhydrides, unsaturated carboxylic acids and unsaturated epoxides. Mention may be made, for example, of maleic anhydride, (meth) acrylic acid and glycidyl methacrylate.

By way of example, mention may be made of core/shell copolymers having a polystyrene shell and core/shell copolymers having a PMMA shell. There are also core/shell copolymers having two shells, one made of polystyrene and the other on the outside made of PMMA. Examples of copolymers and processes for preparing them are described in the following patents: U.S. Pat. No. 4,180,494; U.S. Pat. No. 3,808,180; U.S. Pat. No. 4,096,202; U.S. Pat. No. 4,260,693; U.S. Pat. No. 3,287,443; U.S. Pat. No. 3,657,391; U.S. Pat. No. 4,299,928; U.S. Pat. No. 3,985,70; and U.S. Pat. No. 5,773,520.

Advantageously, the core represents 70 to 90% and the shell represents 30 to 10%, by weight, of the core/shell copolymer.

As an example of a copolymer, mention may be made of that consisting (i) of 75 to 80 parts of a core comprising at least 93 mol % butadiene, 5 mol % styrene and 0.5 to 1 mol % divinylbenzene and (ii) 25 to 20 parts of two cores essentially of the same weight, one on the inside made of polystyrene and the one on the outside made of PMMA.

As other examples, mention may be made of those having a core made of poly(butylacrylate) or a butylacrylate/butadiene copolymer and a shell made of PMMA.

All these core/shell copolymers are sometimes referred to as soft/hard copolymers because the core is made of an elastomer.

There are also other types of core/shell copolymers, such as hard/soft/hard core/shell copolymers, that is to say they have, in the following order, a hard core, a soft shell and a hard shell. The hard parts may consist of the polymers of the shell of the above soft/hard copolymers and the soft part may consist of the polymers of the core of the above soft/hard copolymers. Mention may be made, for example, of those consisting, in the following order, of:

a methyl methacrylate/ethyl acrylate copolymer core;
a butyl acrylate/styrene copolymer shell; and
a methyl methacrylate/ethyl acrylate copolymer shell.

There are also other types of core/shell copolymers such as hard (core) soft/semi-hard copolymers. Compared with the previous ones, the difference stems from the "semi-hard" outer shell which consists of two shells, one the intermediate shell and the other the outer shell. The intermediate shell is a copolymer of methyl methacrylate, styrene and at least one monomer chosen from alkyl acrylates, butadiene and isoprene. The outer shell is a PMMA homopolymer or copolymer. Mention may be made, for example, of those consisting, in the following order, of:

a methyl methacrylate/ethyl acrylate copolymer core;
a butyl acrylate/styrene copolymer shell;
a methyl methacrylate/butyl acrylate/styrene copolymer shell; and
a methyl methacrylate/ethyl acrylate copolymer shell.

According to one particular embodiment of the invention, the adhesive layer comprises, by weight:

20 to 60 parts of PVDF,
10 to 60 parts of functionalized PMMA,
0 to 50 parts of an acrylic elastomer,
0 to 4 parts of a UV absorber,
the total making 100 parts.

According to another particular embodiment of the invention, the adhesive layer comprises, by weight:

25 to 35 parts of PVDF,
45 to 55 parts of functionalized PMMA,
8 to 18 parts of an acrylic elastomer,
2 to 3 parts of a UV absorber,
the total making 100 parts.

According to another particular embodiment of the invention, the adhesive layer comprises, by weight:
30 to 35 parts of PVDF,
50 to 55 parts of functionalized PMMA,
8 to 12 parts of an acrylic elastomer,
2 to 3 parts of a UV absorber
the total making 100 parts.

This composition shows no blooming of the UV absorber.

When choosing the proportions of the acrylic elastomer, it is necessary to take into account the fact that it may already be contained in the PMMA. This is because there are commercial PMMA grades called "impact" grades which contain acrylic impact modifiers, usually of the core/shell type. These acrylic impact modifiers may also be present in the PMMA because they have been introduced during polymerization or prepared simultaneously during polymerization.

The composition of the adhesive layer may be prepared by melt blending the optional PDVF, the PMMA and the optional acrylic elastomer, to which the optional UV absorber is added. Advantageously, thermoplastic mixers are used. The layer of (A) is prepared in the same way.

The film formed from the adhesive layer and the layer (A) may be manufactured by any means. For example, the layer (A) is manufactured by casting, that is to say it is extruded in a sheet die and then drops onto chill rolls, and then the adhesive layer is laminated onto this layer (A). It is thus possible to cast-coextrude the adhesive layer and the layer (A), that is to say the melt of the various layers is forced through sheet dies placed very close to each other, the combination of the melts forming the multilayer film, which is cooled by passing it over rolls at a controlled temperature. By adjusting the speeds of the rolls placed in the machine direction and/or the rolls placed in the transverse direction, a film may be stretched in the machine direction and/or in the transverse direction. It is also possible to carry out a coextrusion-blowing operation. All these techniques are known per se.

The thickness of the layer (A) is advantageously between 2 and 50 μm and that of the adhesive layer between 10 and 100 μm.

As a variant, the adhesive layer may consist of two adjacent layers, one as described above and the other essentially consisting of functionalized PMMA and optionally of an acrylic elastomer and placed opposite the layer (A). That is to say, what is obtained is, in the following order: the layer essentially consisting of functionalized PMMA and optionally of an acrylic elastomer, the above adhesive layer (functionalized PMMA, optional PVDF, optional acrylic elastomer and optional UV absorber) and the layer (A). This layer essentially consisting of functionalized PMMA and optionally of an acrylic elastomer serves to strengthen the adhesive layer/layer (A) film. Its thickness may be from 10 to 200 μm.

With regard to the optional peelable protective layer, this is a temporary layer for protecting the layer (A) during the film-handling, the optional thermoforming and the injection moulding steps. This protective layer makes it possible to maintain or promote a given surface finish. Thus, this layer may be smooth or rough, depending on the desired surface finish. This layer avoids the use of a mould release agent liable to degrade the surface finish. This layer has, for example, a thickness of between 10 and 150 μm and preferably from 50 to 100 μm. The materials that can be used for producing this layer may be chosen from (i) saturated polyesters, such as PET, PBT, copolyesters and polyetheresters, (ii) polyolefin homopolymers or copolymers, such as polyethylenes and polypropylenes, and (iii) polyamides. As an example, mention may be made of the PET sold under the brand name MYLAR by DuPont. This layer may contain various fillers, such as $TiO_2$, silicone, kaolin, calcium carbonate, aluminium flakes and derivatives thereof. It is also possible to use a thick peelable layer, for example one having a thickness of several mm or even up to 10 or 20 mm. In this case, it is not peelable in the strict sense, but is temporary, that is to say it does not adhere to the PVDF but serves as a backing.

According to a second embodiment of the invention, the layer (A) is in the form of two layers:
one placed against the adhesive layer and comprising, as main constituents, 50 to 90 parts of PVDF per 50 to 10 parts of PMMA, respectively;
the other (also called the outer layer) comprising, as main constituents, 75 to 100 parts of PVDF per 25 to 0 parts of PMMA, respectively.

Advantageously, the outer layer comprises, as main constituents, 85 to 100 parts of PVDF per 15 to 0 parts of PMMA, respectively, and preferably 90 to 100 parts of PVDF per 10 to 0 parts of PMMA, respectively.

The thickness of the adhesive layer is advantageously between 10 and 100 μm and that of each of the other layers is advantageously between 2 and 50 μm.

These films are manufactured using the same techniques as described above in the case of films formed from an adhesive layer and a PVDF layer.

The multilayer film of the invention is used to cover objects made of a thermoset (the substrate) for example either by overmoulding or by hot-pressing onto the thermoset. Advantageously, the overmoulding technique is used. The film is placed in a mould, the layer (A) being placed against the wall of the mould, then the precursor of the thermoset is injected into the mould (that is to say on the adhesive layer side of the film) and then crosslinked in order to obtain a thermoset coated with (A). The term "precursor" denotes the complete composition with the ingredients needed for crosslinking and the optional fillers, such as, for example, glass fibres.

If the mould is of simple shape, injecting the precursor of the thermoset is sufficient to press the film against the wall of the mould; the film is then used as obtained. If the mould is of more complicated shape, to avoid stresses in the film and to ensure good contact between the film and the walls of the mould, it is necessary to preform the film by thermoforming before it is placed in the mould. It is possible to use another mould of the same shape and, using a piece having the same shape, but of positive form, the film is thermoformed; it is also possible to use the same mould as that serving for injection-moulding the substrate. It is also possible, for conditions that are intermediate between the previous ones, not to carry out thermoforming but to put the film as such in the mould and using compressed air on the side in which the precursor of the thermoset is injected, to press the film against the wall of the mould. It is also possible to create a vacuum on the other side of the film in order to press it against the wall of the mould. The crosslinking is then carried out in order to obtain a thermoset covered with (A).

It would not be outside the scope of the invention if, instead of injecting the precursor of the thermoset, a sheet of the thermoset precursor were to be deposited on the adhesive layer of the film already in the mould and then for the mould to be closed. Next, the crosslinking is carried out. This sheet of the thermoset precursor comes from a SMC, that is to say the precursor of the thermoset placed between two backing films. The SMC is cut to the dimensions of the mould or to the required dimensions, the backing films are peeled off and the sheet formed from the thermoset precursor is obtained. The SMC is generally composed of a crosslinkable polymer resin, in particular an unsaturated polyester, reinforcing fillers, such as glass fibres, and various other additives in small amounts. The SMC is ordinarily prepared by depositing fibres on a layer of unsaturated polyester resin, which is itself supported on a moving film, generally composed of polyethylene or polyamide. Another film of the same type is then deposited on top of the resin/reinforcing filler system in order to form a composite mass sandwiched between two films. The sandwich then passes through a series of kneading and compacting rolls and is generally wound up in the form of large rolls. It is then stored before subsequent conversion. During the storage period, the polyester resin partially crosslinks, causing an increase in the viscosity of the SMC, until a consistency is reached which makes it capable of being moulded. The SMC users, generally moulders, cut a portion of suitable dimensions from the roll, remove the backing film by peeling it off and place the SMC in a mould heated for the simultaneous conversion and complete curing. Thus, SMC sandwich composites are easy to apply in compression moulding operations.

The invention also relates to an SMC multilayer structure (SMC being the abbreviation for Sheet Moulding Compound), which comprises, in the following order:
  a backing film;
  a crosslinkable composition (the precursor of the thermoset);
  an adhesive layer comprising, by weight:
    0 to 60 parts of PVDF,
    10 to 100 parts of functionalized PMMA,
    0 to 50 parts of an acrylic elastomer,
    0 to 4 parts of a UV absorber,
    the total making up 100 parts;

a layer (A) comprising, as main constituents, 0 to 100 parts of PVDF per 100 to 0 parts of PMMA, respectively.

All the details of the constituents of this SMC structure have been described above (except for the backing film) and are valid for this SMC structure. This also applies to the optional peelable layer on the layer (A) side and the replacement of the layer (A) by two layers.

The backing film has three main properties. The first relates to the permeability to styrene. It is necessary for this backing film to have a very low styrene permeability so as to avoid the loss of styrene monomer, which acts as reactive diluent in the precursor of the thermoset. This loss of styrene monomer is also prejudicial for the health of individuals during SMC manufacturing operations and during its storage. The second property relates to the ease of peeling this film off the polyester structure, so that no residual film remains on the structure and the risks of this film tearing during SMC manufacturing and conversion operations are avoided. Finally, the water uptake and the water permeability of these backing films must be very low so that the amount of thermosetting resin (for example the highly water-sensitive polyester) is not impaired during the SMC manufacturing, storage or SMC conversion operations. This backing film is generally made of polyethylene, polyamide or a polyamide alloy; it may be a monolayer or a multilayer. The prior art has already described such films and mention may be made, for example, of Patents EP 506 515, EP 786 319, EP 990 515 and EP 997 268. The thickness of the backing film may be between 10 and 100 μm.

This SMC multilayer structure may be manufactured by laminating the thermoset precursor to the backing film and the film formed from adhesive layer and the layer (A), that was manufactured beforehand, is applied thereto.

The SMC structure is cut as required, the backing film is peeled off, the structure is placed in the mould, and then crosslinked in order to obtain an article made of a thermoset covered with a film of (A). Depending on the shape of the article, the process may start with a thermoforming operation or may involve only a thermoforming operation if this is sufficient to obtain the thermoset covered with (A).

According to a second embodiment of this SMC structure, the backing film may be replaced with an adhesive layer and film of (A), that is to say what is obtained is a symmetrical structure in which the crosslinkable composition is at the centre.

As in the first embodiment of the SMC structure above, a peelable protective layer may be placed adjacent to the layer (A) and the layer (A) may be in the form of two layers.

All the details of the constituents of this SMC structure have been described above and are valid for this SMC structure. This also relates to the optional peelable layer on the layer (A) side and to the replacement of the layer (A) with two layers.

The SMC structure is cut as required, placed in a mould and then crosslinked in order to obtain an article made of a thermoset covered on each side, or completely depending on its shape, with a film (A). Depending on the shape of the article, the process may commence with a thermoforming operation or involve only a thermoforming operation, if it is sufficient for obtaining the thermoset covered with (A).

The following figures illustrate a few aspects of the invention.

EXAMPLES

The following products are used:
KYNAR 720: PVDF homopolymer from Atofina, having an MVI (melt volume index) of 10 cm$^3$/10 min (230° C./5 kg);
OROGLAS V 825 T: PMMA from Atoglas, having an MVI of 2.5 cm$^3$/10 min (230° C./3.8 kg);
OROGLAS HT121: PMMA (MMA/methacrylic acid copolymer) containing 3.8% acid and having an MFI of 2 g/10 min (230° C./3.8 kg); and
EXL 3600: Acrylic core/shell copolymer based on methyl methacrylate, butadiene and styrene, from Rohm and Haas.

Example 1 (according to the invention)

Composition of the adhesive layer: this comprises, by weight, 50% Kynar 720, 15% OROGLAS OROGLAS HT121 and 35% EXL 3600.

Composition of the PVDF layer: 80% by weight Kynar 720 and 20% by weight of OROGLAS V825 T.

Composition of the resin: Typical orthophthalic-based polyester SMC resin.

A bilayer film, formed from an adhesive layer according to the invention and a PVDF layer (A) obtained beforehand by standard film coextrusion techniques, was deposited in the bottom of a flat mould heated to 140° C. A specimen of a commercial SMC resin supplied by Cray Valley was cut so as to cover about 70% of the inside of the mould. The structure was then moulded for 5 minutes and cooled for 2 minutes. After demoulding, it was completely impossible to peel off the bilayer from the crosslinked resin.

A mark using a STAEDTLER Lumocolor Permanent felt pen made on the coated face of the film according to the invention was easily removed, whereas it was impossible to remove the mark on the uncoated face.

The odours from residual monomers and the odours from curing residues were inhibited on the coated surface side, whereas they were still present on the uncoated side.

Example 2 (Comparative Example)

A bilayer film, formed from an adhesive layer as in Example 1 but with the PMMA unfunctionalized (i.e. OROGLAS V 825 T) and a PVDF layer (A) (identical to that of Example 1) obtained beforehand by conventional film coextrusion techniques, was deposited in the bottom of a flat mould heated to 140° C. A specimen of a commercial SMC resin supplied by Cray Valley (identical to that of Ex. 1) was cut so as to cover about 70% of the inside of the mould. The structure was then moulded for 5 minutes and cooled for 2 minutes. After demoulding, it was possible to peel off the fluorinated bilayer from the crosslinked resin.

Example 3 (Comparative Example)

A PVDF monolayer film obtained beforehand by standard film extrusion techniques was deposited in the bottom of a flat mould heated to 140° C. A specimen of a commercial SMC resin supplied by Cray Valley (identical to that of Example 1) was cut so as to cover about 70% of the inside of the mould. The structure was then moulded for 5 minutes and cooled for 2 minutes. After the moulding, it was possible to peel off the PVDF monolayer film from the crosslinked resin.

What is claimed is:

1. A film, formed from an adhesive layer and a layer (A), for coating articles made of a thermoset, wherein the adhesive layer comprises, by weight:
   up to 60 parts of polyvinylidene fluoride (PVDF),
   10 to 100 parts of functionalized polymethyl methacrylate (PMMA),
   up to 50 parts of an acrylic elastomer,
   0 to 4 parts of a UV absorber,
   the balance making up 100 parts,
and the layer (A) comprises, as main constituents, 0 to 100 parts of PVDF per 100 to 0 parts of PMMA, respectively.

2. The film according to claim 1, in which the proportion of UV absorber is between 2 and 3 parts.

3. The film according to claim 1, in which the adhesive layer comprises:
   20 to 60 parts of PVDF,
   10 to 60 parts of functionalized PMMA,
   up to 50 parts of an acrylic elastomer,
   0 to 4 parts of a UV absorber,
   the balance making up 100 parts.

4. The film according to claim 1, in which the adhesive layer comprises:
   25 to 35 parts of PVDF,
   45 to 55 parts of functionalized PMMA,
   8 to 18 parts of an acrylic elastomer,
   2 to 3 parts of a UV absorber,
   the balance making up 100 parts.

5. The film according to claim 1, in which the adhesive layer comprises:
   30 to 35 parts of PVDF,
   50 to 55 parts of functionalized PMMA,
   8 to 12 parts of an acrylic elastomer,
   2 to 3 parts of a UV absorber,
   the balance making up 100 parts.

6. The film according to claim 1, in which the acrylic elastomer is of the core/shell type.

7. The film according to claim 1, in which a peelable protective layer is deposited on the layer (A) side.

8. The film according to claim 1, in which the layer (A) comprises, as main constituents, 70 to 100 parts of PVDF per 30 to 0 parts of PMMA, respectively.

9. The film according to claim 1, in which the thickness of the layer (A) is between 2 and 50 μm and that of the adhesive layer is between 10 and 100 μm.

10. The film according to claim 1, in which the layer (A) is in the form of two layers:
    one placed against the adhesive layer and comprising, as main constituents, 50 to 90 parts of PVDF per 50 to 10 parts of PMMA, respectively;
    the other (also called the outer layer) comprising, as main constituents, 75 to 100 parts of PVDF per 25 to 0 parts of PMMA, respectively.

11. The film according to claim 10, in which the outer layer comprises, as main constituents, 85 to 100 parts of PVDF per 15 to 0 parts of PMMA, respectively.

12. The film according to claim 10, in which the thickness of the adhesive layer is between 10 and 100 μm and that of each of the other layers is between 2 and 50 μm.

13. The film according to claim 1, further comprising a layer consisting essentially of functionalized PMMA placed against the adhesive layer and opposite the thermoset.

14. The film according to claim 1, further comprising a layer consisting essentially of functionalized PMMA and an acrylic elastomer, is placed against the adhesive layer and opposite the thermoset.

* * * * *